United States Patent
Paek et al.

(10) Patent No.: US 9,304,683 B2
(45) Date of Patent: Apr. 5, 2016

(54) ARCED OR SLANTED SOFT INPUT PANELS

(71) Applicant: Microsoft Corporation, Redmond, WA (US)

(72) Inventors: Timothy S. Paek, Sammamish, WA (US); Dmytro Rudchenko, Bellevue, WA (US); Bongshin Lee, Issaquah, WA (US); Nikhil Devanur Rangarajan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 13/727,629

(22) Filed: Dec. 27, 2012

(65) Prior Publication Data

US 2014/0101593 A1 Apr. 10, 2014

Related U.S. Application Data

(60) Provisional application No. 61/712,155, filed on Oct. 10, 2012.

(51) Int. Cl.
*G06F 3/048* (2013.01)
*G06F 3/0488* (2013.01)
*G06F 3/041* (2006.01)
*G06F 3/023* (2006.01)

(52) U.S. Cl.
CPC .......... *G06F 3/04886* (2013.01); *G06F 3/023* (2013.01); *G06F 3/0416* (2013.01); *G06F 3/04883* (2013.01)

(58) Field of Classification Search
None
See application file for complete search history.

(56) References Cited

U.S. PATENT DOCUMENTS

| 5,544,295 | A | 8/1996 | Capps |
| 7,170,428 | B2 | 1/2007 | Himberg et al. |
| 7,307,620 | B2 * | 12/2007 | Siddeeq ................. 345/169 |
| 7,525,534 | B2 | 4/2009 | Skillman et al. |
| D603,853 | S * | 11/2009 | Lee ........................ D14/247 |
| 8,627,224 | B2 * | 1/2014 | Dahl ............... G06F 3/04886 345/173 |
| 9,104,299 | B2 * | 8/2015 | Li ................. G06F 3/04847 |
| 2004/0104896 | A1 | 6/2004 | Suraqui |

(Continued)

FOREIGN PATENT DOCUMENTS

| CN | 102375691 A | 3/2012 |
| EP | 1555601 A2 | 7/2005 |

(Continued)

OTHER PUBLICATIONS

"International Search Report (ISR) and Written Opinion for PCT Patent Application No. PCT/US2013/063956", Mailed Date: Jan. 12, 2015, 6 pages.

(Continued)

*Primary Examiner* — Matt Kim
*Assistant Examiner* — Maryam Ipakchi
(74) *Attorney, Agent, or Firm* — Timothy Churna; Judy Yee; Micky Minhas

(57) ABSTRACT

A soft input panel (SIP) for a computing device is configured to be used by a person holding a computing device with one hand. For example, a user grips a mobile computing device with his right hand at the bottom right corner and uses his right thumb to touch the various keys of the SIP, or grips a mobile computing device with his left hand at the bottom left corner and uses his left thumb to touch the various keys of the SIP. The SIP comprises arced or slanted rows of keys that correspond to the natural pivoting motion of the user's thumb.

20 Claims, 10 Drawing Sheets

(56) References Cited

U.S. PATENT DOCUMENTS

| | | | |
|---|---|---|---|
| 2005/0184963 A1* | 8/2005 | Fyke | 345/168 |
| 2006/0022947 A1* | 2/2006 | Griffin | G06F 1/1626 345/168 |
| 2006/0055669 A1 | 3/2006 | Das | |
| 2009/0146848 A1* | 6/2009 | Ghassabian | G06F 1/1615 341/22 |
| 2009/0237361 A1 | 9/2009 | Mosby et al. | |
| 2010/0164879 A1* | 7/2010 | Doktorova et al. | 345/173 |
| 2010/0235726 A1 | 9/2010 | Ording et al. | |
| 2010/0238125 A1 | 9/2010 | Ronkainen | |
| 2010/0241985 A1 | 9/2010 | Kim et al. | |
| 2010/0277414 A1 | 11/2010 | Tartz et al. | |
| 2010/0315266 A1 | 12/2010 | Gunawardana et al. | |
| 2011/0078613 A1 | 3/2011 | Bangalore | |
| 2011/0304550 A1 | 12/2011 | Romera et al. | |
| 2012/0036469 A1 | 2/2012 | Suraqui | |
| 2012/0075194 A1* | 3/2012 | Ferren | 345/168 |
| 2012/0162078 A1* | 6/2012 | Ferren et al. | 345/168 |
| 2012/0166995 A1 | 6/2012 | McAleer | |

FOREIGN PATENT DOCUMENTS

| | | |
|---|---|---|
| EP | 2079010 A2 | 7/2009 |
| GB | 2474047 A | 4/2011 |
| WO | 2011113057 A1 | 9/2011 |
| WO | 2012155776 A1 | 11/2012 |

OTHER PUBLICATIONS

"Response to International Search Report (ISR) and Written Opinion for PCT Patent Application No. PCT/US2013/063956", Filed Date: Jul. 15, 2014, 6 pages.

"International Search Report & Written Opinion for PCT Application No. PCT/US2013/063965", Mailed Date: Feb. 6, 2014, Filed Date: Oct. 9, 2013, 8 Pages.

"International Search Report & Written Opinion for PCT Application No. PCT/US2013/063984", Mailed Date: Jan. 29, 2014, Filed Date: Oct. 9, 2013, 9 Pages.

"International Search Report & Written Opinion for PCT Application No. PCT/US2013/064192", Mailed Date: Feb. 17, 2014, Filed Date: Oct. 10, 2013, 8 Pages.

"International Search Report & Written Opinion for PCT Patent Application No. PCT/US2013/063976", Mailed Date: Feb. 10, 2014, Filed Date: Oct. 9, 2013, 8 Pages.

"International Search Report & Written Opinion for PCT Application No. PCT/US2013/063956", Mailed Date: Apr. 11, 2014, Filed Date: Oct. 9, 2013, 15 Pages.

Ghosh, et al., "Effective Virtual Keyboard Design with Size and Space Adaptation", In Proceedings of the IEEE Students' Technology Symposium, Apr. 3, 2010, pp. 1-6.

Gunawardana, et al.,"Usability Guided Key-Target Resizing for Soft Keyboards", In Proceedings of the 15th International Conference on Intelligent User Interfaces, Feb. 7, 2010, pp. 1-8.

Crook, "Leaked Windows Phone Keyboard: Curved for your Typing Pleasure", Retrieved at <<http://techcrunch.com/2012/07/02/leaked-windows-phone-keyboard-curved-for-your-typing-pleasure/>>, Retrieval Date: Dec. 26, 2012, pp. 1-4.

* cited by examiner

ARCED OR SLANTED SOFT INPUT PANELS

RELATED APPLICATION

This application claims the benefit of U.S. Provisional Application No. 61/712,155, filed on Oct. 10, 2012, and entitled "ARCED OR SLANTED SOFT INPUT LABELS," the entirety of which is incorporated herein by reference.

BACKGROUND

Some computing devices include a touchscreen keyboard, or soft input panel (SIP), instead of a conventional physical keyboard for a user to enter text. A SIP is typically a substitute for a physical keyboard and includes a plurality of regions or panes on a touchscreen that, when touched, allow a user to enter a specific character or provide other functions similar to a standard keyboard.

SUMMARY

The following is a brief summary of subject matter that is described in greater detail herein. This summary is not intended to be limiting as to the scope of the claims.

Disclosed herein are embodiments of soft input panels for a computing device that can be configured to be used by a person holding a computing device with one hand. For example, a user can grip a mobile computing device with his right hand at the bottom right corner and use his right thumb to touch the various keys of the SIP, or grip a mobile computing device with his left hand at the bottom left corner and use his left thumb to touch the various keys of the SIP. In some embodiments, the SIP can comprise arced or slanted rows of keys that correspond to the natural pivoting motion of the user's thumb. In some embodiments, the SIP can be switched from one side to the other when switching hands. In some embodiments, the SIP can be sized and/or resized based on the range of motion of a particular user's thumb. In some embodiments, one or more of the keys of the SIP can be used to enter more than one different letter, such as using a disambiguation process. In some embodiments, some of the keys can be triangular. In some embodiments, the boundaries between the keys can be arcuate and/or comprise concentric arcs, and in other embodiments, the boundaries between the keys can comprise slanted linear boundaries.

The disclosed technology can allow a user to more effectively use a computing device with one hand, especially a mobile device that the user is holding with one hand, such as a mobile phone or tablet. Furthermore, the disclosed technology provides for customization of a SIP based on the anatomy of a user's hand and thumb. The arced or slanted arrangement of the keys of the disclosed SIPs adapts to the natural motions of a user's thumb to provide a more natural and intuitive text entry process. In some embodiments, the SIP can comprise keys that are larger and easier to hit compared to conventional SIPs, reducing text entry errors and making the keys easier to find. The disclosed SIPs can also comprise functionality that allows the user to close the SIP panel in the middle of a text entry process, such as to view the document or text field being typed in, and then reopen the SIP to continue text entry. Furthermore, the user can switch hands at any point in the text entry process and easily have the SIP switch sides to conform to the user's other thumb.

Other aspects will be appreciated upon reading and understanding the attached figures and description.

DETAILED DESCRIPTION

Figure 1:
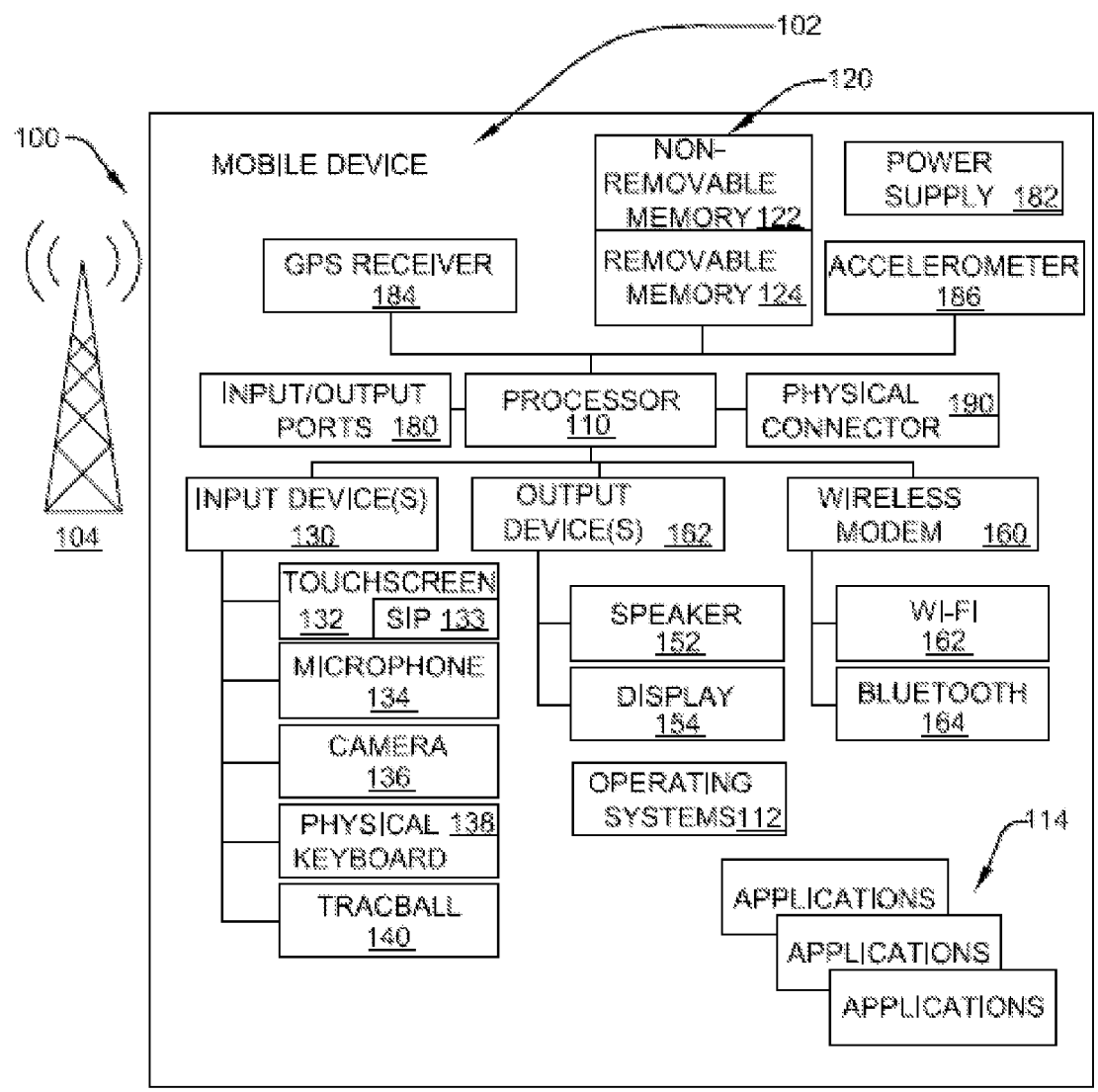
FIG. 1 is a schematic diagram depicting an exemplary mobile device with which any of the disclosed embodiments can be implemented.

Various technologies pertaining to soft input panels on mobile devices will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

Figure 3:
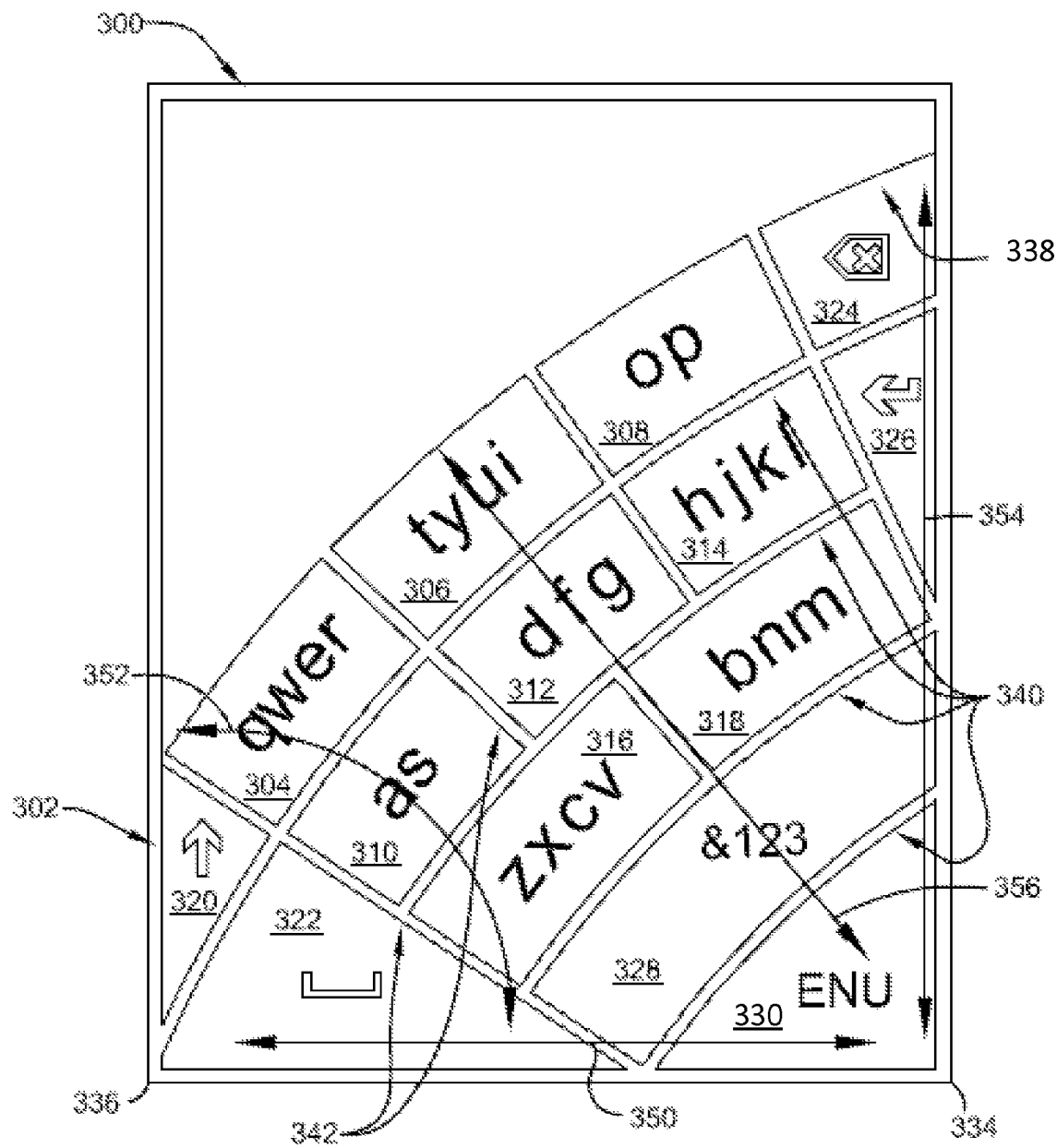
FIGS. 3-8 show exemplary embodiments of soft input panels for a computing device.

FIG. 3 shows an exemplary touchscreen 300 for a computing device, such as a tablet or mobile phone. The touchscreen 300 comprises a soft input panel (SIP) 302 that allows a user to select text characters and enter other commands, such as "enter" and "backspace," by touching the different regions of the touchscreen. As used herein, the term "soft input panel" is used broadly and includes any virtual keyboard or touchscreen keyboard. The SIP 302 can be used for many different tasks, such as writing text messages or emails, entering data on a website, etc.

A SIP can comprise a plurality of discrete regions referred herein to as "keys." For example, the SIP 302 comprises the keys labeled 304 through 330 in FIG. 3. Each of the keys can be used to perform a different command by touching the key. Exemplary commands can include entering a text character, backspacing, shifting to a different set of keys, etc.

A SIP can be configured to be used by a person holding a computing device with one hand. For example, a user can grip a mobile computing device with his right hand at the bottom right corner and use his right thumb to touch the various keys of the SIP, or grip a mobile computing device with his left hand at the bottom left corner and use his left thumb to touch the various keys of the SIP. Each of the SIP embodiments described herein can be configured to be used by a person holding the computing device with one hand and using the thumb of that hand to touch the keys of the SIP. While the exemplary SIPs shown in FIGS. 3-8 are configured for use by a person holding the computing device with his right hand, other embodiments not shown can be configured for use with the left hand in a similar manner. The keys of a right-handed SIP (e.g., those shown in FIGS. 3-8) can be clustered near the bottom right corner of the touchscreen. For example, the keys of the SIP 302 in FIG. 3 are clustered near the bottom right corner 334 of the touchscreen 300. Similarly, the keys of a left-handed SIP can be clustered near the bottom left corner (e.g., 336) of the touchscreen. Clustering the keys near a corner of the touchscreen can make it easier for a user to reach the keys with his thumb.

The keys of a SIP can be rectangular, triangular, have other polygonal shapes, and/or can have shapes at least partially defined by non-linear boundaries. For example, the keys of the SIP 302 can be partly defined by a plurality of curved or arcuate boundaries, including a curved upper boundary 338 and curved intermediate boundaries 340, partly defined by a plurality of linear boundaries, some of which are labeled 342, and/or partly defined by the linear edges of the touchscreen 300. For example, the key 320 is defined by the left edge of the touchscreen 300, one of the linear boundaries 342, and one of the curved boundaries 340. In some embodiments, the keys can also have rounded corners.

A user's thumb anatomically pivots in an arc motion that is generally centered at a point adjacent his wrist. The keys of a SIP can therefore be arranged in a corresponding arced pattern to allow the user to more naturally move his thumb to different keys. The SIP can comprise curved boundaries between the keys that have a center of curvature located approximately where a user's thumb would pivot about his wrist. For example, in the SIP 302, the curved boundaries 338 and 340 can have one or more centers of curvature below and/or to the right of the bottom right corner 334 of the touchscreen 300. The center(s) of curvature of the curved boundaries 338 and 340 can be located, for example, at or near the bottom right corner of the computing device, or farther away from the touchscreen 300, such as below and to the right of the bottom right corner of the computing device, such as where a user's thumb-wrist joint would be located when holding the computing device in the right hand. In some embodiments, one or more of the curved boundaries 338, 340 can be concentric.

In some embodiments, one of the curved boundaries can intersect with the opposite bottom corner of the touchscreen. For example, one of the boundaries 340 intersects with the bottom left corner 336 in FIG. 3. The number of curved boundaries in a SIP can vary, such as from one to 5 or more. In some embodiments, the curved boundaries can be equally spaced apart radially, such that the keys defined between the curved boundaries have an equal radial height (as measured from the center of curvature of the curved boundaries).

Some of the keys of a SIP can be larger or smaller than other keys. For example, some of the keys can have a greater area than other keys. For example, the key 328 in FIG. 3 has a greater area than many of the other keys. Some of the keys can be wider or longer than other keys. For example, the key 328 is longer than the keys 316 and 318, and those keys are longer than the keys 310, 312 and 314. The size of a key can make it easier for a user to located and touch that key. More commonly used keys can be made larger in area in some SIPs. For example, the space bar key 322 can be larger than many other keys because the spacebar key is very commonly used. Other, less commonly used keys can be made smaller.

The location of a key on the SIP 302 can also make that key easier or more difficult to reach and touch. For example, the alpha keys (304-318) of the SIP 302 can be clustered in the center of the SIP 302 to make them more readily reachable. Other commonly used keys, such as the backspace key 324, can be located to the side of the letter keys where they are also readily accessible by the user's thumb since they are also positioned along the natural arc path made by the thumb. On the other hand, lesser used keys, such as the language key 330 (labeled "ENU") can be positioned near the bottom/inner corner of the SIP 302 (e.g., near the bottom right corner 334 in FIG. 3) or other fringes of the SIP 302 where it is more difficult to reach. Positioning the keys in a manner similar to a common QWERTY keyboard can also make is easier and faster for a user to locate the keys. For example, the backspace key 324 and return key 326 can be located on the right hand side of the SIP 302, like they are on a QWERTY keyboard, to make locating those keys more intuitive for a user.

A user can have a limited range when using his thumb to touch the keys of a SIP. The thumb range may be limited radially, such as by a maximum radial reach and/or by a minimum radial reach. Depending on the user's anatomy, the way he holds the device, and the size of the device, the maximum and/or minimum radial reach limits of his thumb can vary. The maximum radial boundary of the SIP 302 can be positioned to correspond to the maximum reach limit of the user's thumb. The maximum radial boundary can comprise a curved upper boundary of the SIP, such as the upper boundary 338 in FIG. 3.

In some cases, a user can bend his thumb inward far enough to reach the bottom corner of the touchscreen 300 near the ball of the thumb, while in other cases there can be a region of the touchscreen 300 adjacent the bottom corner near the ball of the thumb that the user cannot easily reach with his thumb, such as with user's having relatively large thumbs. Thus, in some embodiments, an area of the touchscreen 300 near that bottom corner can be left open or empty and not be part of the SIP 302. The radial limits of the SIP 302 can be set or adjusted by the user swiping his thumb radially in a full range of motion, which can be done to initially invoke or open the SIP 302, for example.

In some embodiments, the SIP 302 can extend angularly (perpendicular to the radial direction) about a 90° angle from one side of the touchscreen to the bottom of the touchscreen, as shown in FIGS. 3-8. In some embodiments, the SIP 302 can also partially border the opposite side edge, as shown in FIGS. 3-8. For instance, in FIG. 3, keys 320 and 322 can appear to intersect with the leftward edge of the touchscreen 300. In other embodiments, the SIP 302 can extend angularly about an angle of less than 90°, such as between 45° and 90°. For example, in some cases a user's thumb can have a limited angular mobility such that it cannot readily be pivoted a full 90° from the side edge of the touchscreen 300 to the bottom edge of the touchscreen 300. Thus, the touchscreen 300, in some embodiments, can have open or non-functional areas near the side edge and/or near the bottom edge that are not part of the SIP 302 and/or do not have any of the keys of the SIP 302. In some embodiments, these non-key regions of the SIP 302 or touchscreen 300 can be used for display purposes instead of input purposes.

In some embodiments, the SIP 302 can be switched between a right handed configuration and a left handed configuration. Thus, if a user switches hands, the SIP 302 can be configured to switch to the opposite bottom corner of the touchscreen. In some embodiments, the mobile device can sense which hand the user is holding the device in. For example, the mobile device can comprise gyroscopic sensors, pressure sensors, and/or other types of sensors that can be used to determine which hand the user is holding the device with. In other embodiments, the user can provide an input to cause the SIP 302 to switch sides. For example, the user can press a key in the SIP 302 that can cause the SIP to switch sides. In some embodiments, the user can slide his thumb (or any other finger or stylus) laterally across the bottom of the touchscreen (e.g., in the directions of arrow 350 in FIG. 3) to cause the SIP 302 to switch sides. For example, if the SIP 302 is at the bottom right corner 334, the user can slide his thumb from right to left across the bottom of the touchscreen to cause the SIP 302 to switch to the bottom left corner 336. In some embodiments, the user can swipe his thumb in an arc motion about a bottom corner of the touchscreen (e.g., in the directions of arrow 352 in FIG. 3) to cause the SIP 302 to switch to that corner. Various other sensory or user input means can also be used to cause the SIP 302 to switch to a different corner of the touchscreen 300.

The radial and/or angular size of the SIP 302 can also be adjusted. In some embodiments, the radial size of the SIP 302 can be adjusted by swiping the thumb radially from near the bottom corner of the SIP (e.g., in the outward direction of arrow 354 or arrow 356 in FIG. 3). The touchscreen 300 can sense the maximum extent of the user's thumb reach from the radial thumb swipe and the radial size of the SIP can be set or adjusted in response to the swipe and/or based on the user's thumb reach. In some embodiments, the minimum reach of the user's thumb can also be determined from a radial thumb swipe. Thus, the radial boundaries of the SIP 302 can be set or adjusted based on the start and end of the user's radial swipe. In some cases, the user can input a plurality of radial swipes and the average, maximum, minimum, or other function of those swipes can be used to set the radial boundaries of the SIP 302. In some embodiments, the radial boundaries of the SIP 302 can be set or adjusted based on one or more arcuate angular swipes made by the user. For example, a user can input a plurality of arcuate angular swipes at different radial positions to provide a range of reach for the user's thumb. In some embodiments, a user can customize the radial boundaries of the SIP 302 in other manners, such as entering coordinates or dimensions, selecting from pre-set configurations, etc.

Similarly, the angular boundaries of the SIP 302 can be adjusted based on user input. In some embodiments, the angular boundaries of the SIP 302 can be adjusted by swiping angularly in an arc, such as in the directions of arrow 352 in FIG. 3 (or in the opposite direction). The touchscreen 300 can sense the maximum extent of the user's angular thumb reach from one or more swipes and the angular boundaries of the SIP 302 can be set according to the ends of the swipe(s) or some other function of the swipe(s). In some embodiments, a user can customize the angular boundaries of the SIP 302 in other manners, such as entering coordinates or dimensions, selecting from pre-set configurations, etc.

In some embodiments, a user can close or put away the SIP 302 by swiping radially or vertically from near the top of the SIP 302 downward or toward a corner (e.g., in the inward direction of the arrow 354 or the arrow 356 in FIG. 3). Similarly, a user can re-open or bring back up the SIP 302 by swiping vertically or radially from a corner. Such a swipe to re-open the SIP 302 can at the same time be used to measure the thumb reach of the user to size the SIP 302.

In some embodiments, various gestures or other actions can be used to manipulate the SIP 302. Swiping across the touchscreen 300 is one example of such a gesture. Other examples can include double tapping certain keys or region, pinching motions using two fingers, spreading two fingers apart across the touchscreen 300, etc. For example, in some embodiments, double tapping the spacebar key can insert a period.

Flicking or swiping with a finger can provide various functions, as described herein. In some embodiments, flicking or swiping actions can be performed before, after, or during text entry, such as to open or close the SIP 302, to resize the SIP 302, or to switch the SIP 302 to the opposite side or bottom corner.

In some embodiments, the SIP 302 can comprise one key for each letter of the alphabet. In other embodiments, the SIP can include one or more keys that can be used to enter more than one letter, such as in the embodiments shown in FIGS. 3-8. Because the SIP 302 is limited in area by the reach of the user's thumb, space is limited and there may not be enough room to have one key for every letter and keys for other important functions like return, space, shift, etc. Thus, by grouping plural letters on some of the keys, fewer keys are needed and the each key can be made larger so they are easier to locate touch without accidentally touching the adjacent keys.

When a user touches keys used for plural letters, such as the key 304 in FIG. 3, a disambiguation program/process can be used to determine which letters/words the user intends to enter. For example, the device can analyze plural keys touched in sequence to determine possible words that the user may be trying to spell. If multiple possible words are determined, the touchscreen can display various options to the user for selection (sometimes referred to as Input Method Editor candidates) and/or the device can select one of the words for the user, such as the most commonly typed word or a word that fits grammatically. In some embodiments, the touchscreen/SIP 302 can display word candidates along or adjacent the upper boundary 338 of the SIP 302, such as in a curved arrangement and/or in a cascading arrangement. In some embodiments, the different candidates can be displayed with different font sizes indicating the probability of the words being the intended word. For example, the different candidates can be arranged such that they gradually decrease in font size from left to right. Various different disambiguation processes are known in the art that can be used when the SIP 302 comprises keys having more than one letter. In some embodiments, touching certain keys can open a picker window having plural picker keys for each of the letters on the base key, allowing the user to select which of the letters he wants to enter. In another embodiment, multi-tap input is used for disambiguation, wherein, for instance, if the user wishes to enter the letter "u," the user can tap the key 306 three times. In other embodiments, single tap disambiguation can be employed, wherein to enter the word "there," the user can tap keys in the following sequence: 306, 314, 304, 304, 304, even though the letters "e" and "r" are not the first letters in the character grouping of the key 304.

In the SIP 302 in FIG. 3, different keys have different numbers of letters associated with them. The keys 304, 306, 314, and 316 each are associated with four letters, the keys 312 and 318 are associated with three letters, and the keys 308 and 310 are associated with two letters. Generally, less commonly used letters, such as "Q" and "Z" can be grouped with more other letters, while more commonly used letters, such as "A" and "O" can be grouped with fewer other letters. In some embodiments, the letters can be grouped such that the various different keys are used more equally in text entry.

With more particularity, the SIP 302 comprises three rows of alphabetic keys, wherein each row includes multiple keys, and each key (or at least a plurality of the keys) represents multiple alphabetical characters. The multiple alphabetical characters, in an exemplary embodiment, are arranged in accordance with the QWERTY standard. A first row of keys includes keys 304, 306, and 308, a second row of keys includes keys 310, 312, and 314, and a third row of keys includes keys 316 and 318. As shown, the first row of keys may be the row positioned furthest from the corner 334 (or corner 336) from amongst all rows, the second row of keys may be positioned adjacent to the first row and closer to the corner 334 (or corner 336), and the third row of keys may be positioned adjacent to the second row and still closer to the corner 334 (or corner 336) when compared to position of the first row and the second row. As used in the specification, the lower the number referring to the row, the further such row can be from a bottom corner of the touchscreen 300, although the claims are not so limited. Thus, it can be ascertained that at least one row of keys in the SIP 302 that represent alphabetical characters is composed of two keys, while at least one other row of keys in the SIP 302 that represent alphabetical characters is composed of at least three keys. Causing the third row of keys that are representative of multiple alphabetical characters to be composed of two keys can be undertaken to ease input of alphabetical characters through selection of keys by way of the thumb of the user. Further, utilizing eight keys (rather than nine) to represent all alphabetical characters can be found to have little detriment when disambiguating text entered by way of the SIP 302.

As shown, in the first row of keys, the key 304 can represent the alphabetical characters "Q," "W," "E," and "R," the key 306 can represent the alphabetical characters "T," "Y," "U," and "I," and the key 308 can represent the alphabetical characters "O" and "P." Thus, a key that represents four alphabetical characters can be positioned in a row of keys that represent alphabetical characters immediately adjacent to a key that represents two characters. In the second row of keys, the key 310 can represent the alphabetical characters "A" and "S," the key 312 can represent the alphabetical characters "D," "F," and "G," and the key 314 can represent the alphabetical characters "H," "J," "K," and "L." Therefore, a key that represents two alphabetical characters can be positioned in a row of keys that represent alphabetical characters immediately adjacent to a key that represents three alphabetical characters. Additionally, a key that represents three alphabetical characters can be positioned in a row of keys that represent alphabetical characters immediately adjacent to a key that represents four alphabetical characters. Finally, in the third row of keys, the key 316 can represent the characters "Z," "X," "C," and "V," and the key 318 can represent the characters "B," "N," and "M." Again, the third row of keys can include two keys, while the first and second row of keys can each include three keys.

In an exemplary embodiment, arrangement of keys and/or alphabetical characters represented by keys can be selected to substantially optimize the ability of the mobile device to disambiguate text desirably generated by the user through the SIP 302. For example, constraints pertaining to design of the SIP 302 can be set forth: exemplary constraints include a constraint on the sequence or relative layout of alphabetical characters to be represented by keys (e.g., to substantially conform to a QWERTY layout), a constraint that restricts character groupings to which a particular alphabetical character can belong (e.g., an alphabetical character can belong to an arbitrary number of character groups, except that the alphabetical character can only belong to neighboring groups from an initially prescribed group), amongst other constraints.

A dictionary of words that can be generated by way of the SIP 302 can then be received, wherein words in the dictionary of words have, for instance, some indication of frequency/probability of use of such words corresponding thereto. Integer programming can be employed to locate groups of characters that satisfy imposed constraints, and an optimization function can be utilized to identify groupings of characters that allow for substantially optimal disambiguation. In an example, a word in the English language desirably entered by way of the SIP 302 can be "this"; first, the key 306 is selected, followed by the key 314, followed by the key 306, followed by the key 310. All possible candidate words that can be generated using such sequence of keys, with characters grouped as shown in FIG. 3, can be identified, sorted by probability or frequency of use in the English language. A score is then assigned based upon position of the desired word "this" in the candidate words. For instance, if the word "this" is first in the candidate words, a first, high score can be output, while if the word "this" is lower in the candidate words, a lower score (or zero score) can be output. This process can be undertaken for each word in a dictionary, for instance, and for each possible grouping of characters that conforms to the constraints. The grouping of characters with the highest score can be output as the desired grouping of characters. Such score can be a highest aggregate score across all words in the dictionary, potentially with words weighted as a function of frequency of use (popularity) of such words. For instance, the characters grouped as shown in the SIP 302 of FIG. 3 can be optimized for a certain dictionary and scoring function, given constraints of character sequence, maximum number of characters that can be represented by a single key, minimum number of characters that can be represented by a single key, amongst other constraints. In yet another embodiment, the groupings can be optimized based upon a dictionary of a user of the mobile device, as different users may have different vocabularies and use words with differing frequencies.

While integer programming has been set forth above as an exemplary technique for identifying groupings of characters in the SIP 302, it is to be understood that other techniques are contemplated. For example, genetic algorithms can be employed to learn an optimal layout for a certain dictionary of terms with known/assumed frequency/probability of user. Still further, while the SIP 302 illustrates English characters, it is to be understood that groupings of characters can be undertaken using characters of other language, such as Japanese.

Figure 4:
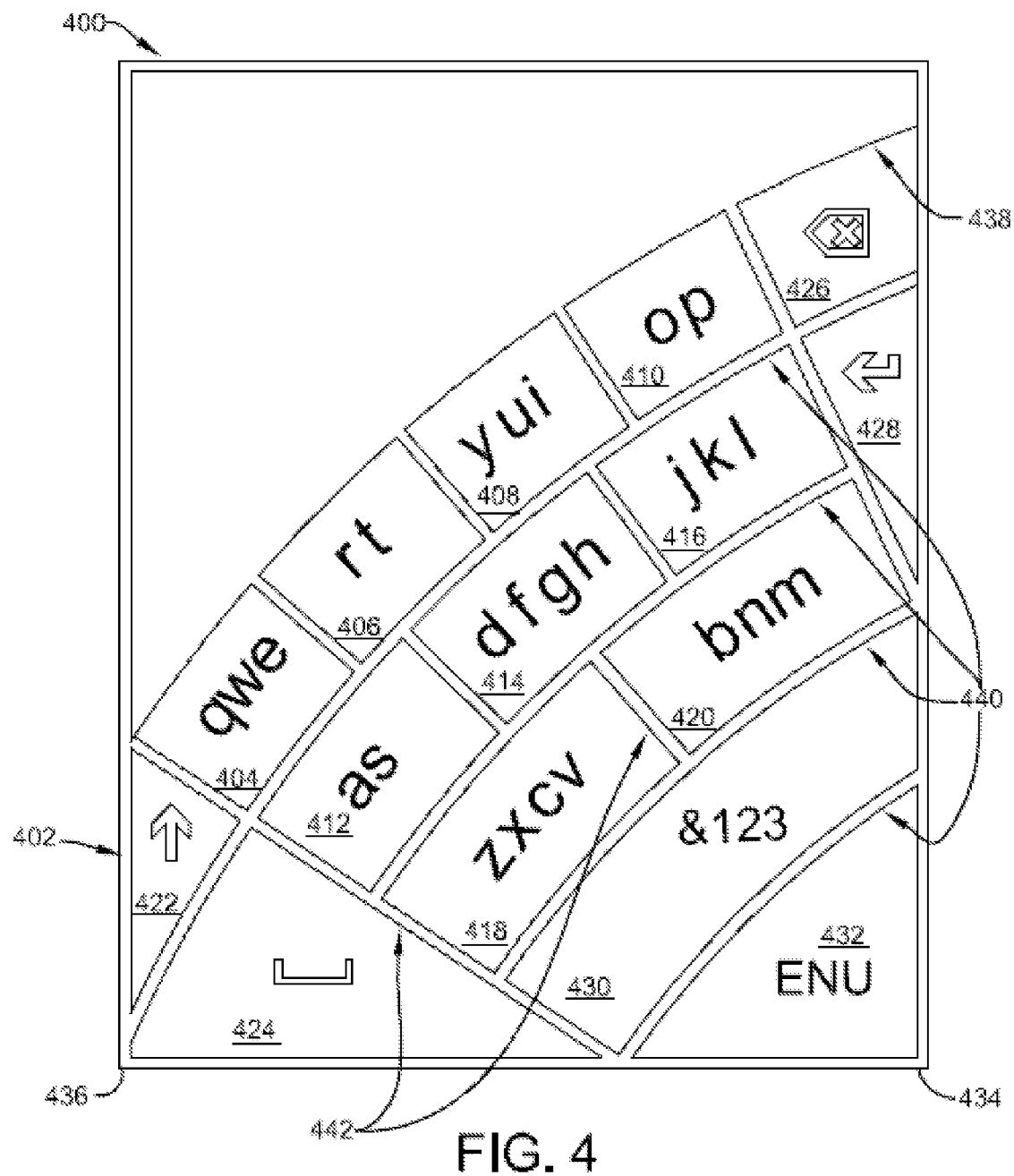

FIG. 4 shows a touchscreen 400 with another embodiment of a SIP 402 having letter group keys 404 through 420. These letter keys are also each associated with more than one letter, though the keys 404-420 are grouped differently than the keys 304-318. The SIP 402 has four letter keys 404-410 across the top row, whereas the SIP 302 has three letter keys 304-308 across the top row, allowing fewer letters on some of the keys of the SIP 402. In various different embodiments, the letters can be grouped in any different manner on any number of different keys of various sizes and positions.

In some embodiments, a SIP can comprise a key that switches the SIP back and forth between having one key for every letter and having one or more keys having groups of letters associated with them. Thus, a user can use such a key to select a text entry style from these different options, depending on particular circumstances or preferences.

In some embodiments, the non-letter keys, such as the keys 422, 424, 426, 428, 430, and 432 can maintain their general position relative to the letter keys when the SIP 402 is switched from one side of the touchscreen to the other, as when a user switches hands. For example, in some embodiments, the spacebar key can remain in a position below the letter keys whether the SIP 402 is on the left or the right side. In other embodiments, the spacebar key can remain to the left, or to the right, of the letter keys whether the SIP is on the left or the right side. In other embodiments, the space bar key can remain positioned adjacent the bottom edge of the touchscreen to the side of the letter keys, as in FIG. 3, such that the spacebar key is to the left of the letter keys when the SIP 402 is on the right side and the spacebar key is on the right side of the letter keys when the SIP 402 is on the left side. Other keys, such as the return key, backspace key, and capitals key can similarly be configured to maintain their positional relationship to the letter keys and/or to each other as the SIP 402 is switched from side to side.

As a user's thumb reaches farther up the SIP 402, the flatter pad of the thumb is used to touch the SIP 402, resulting in a larger contact area when touching the SIP farther from the bottom corner. On the other hand, when the thumb is bent sharply to reach the keys closer to the bottom corner of the SIP 402, the tip of the thumb is used to touch the keys, resulting in a smaller contact area. Thus, in some embodiments, some keys can have different heights and/or areas than other keys. In some embodiments, different rows of keys can have different heights and/or areas than other rows of keys. For example, in some embodiments, the keys farther from the bottom corner of the touchscreen 400 can have a larger height and/or area than the keys closer to the bottom corner. The outermost or uppermost row of keys can have a greater height than the lower rows of keys. The height of the keys can increase gradually from row to row as a function of the distance of the row from the bottom corner to correspond to the flattening of the thumb as it reaches farther up the SIP 402.

The SIP 402 shown in FIG. 4 comprises three rows of alphabetical character keys (also referred to as letter keys), wherein each key in the rows of keys represents alphabetical characters. The first row is composed of four keys: the key 404, which represents the characters "Q," "W," and "E," the key 406, which represents the characters "R" and "T," the key 408, which represents the characters "Y," "U," and "I," and the key 410, which represents the characters "O" and "P." The second row of keys is composed of three keys: the key 412, which represents the characters "A" and "S," the key 414, which represents the characters "D," "F," "G," and "H," and the key 416, which represents the characters "J," "K," and "L." The third row is composed of two keys: the key 418, which represents the characters "Z," "X," "C," and "V," and the key 420, which represents the characters "B," "N," and "M." Accordingly, the rows of alphabetical characters in the SIP 402 include a row with four keys, a row with three keys, and a row with two keys. When choosing character groupings in the keys, for instance, constraints can be set forth, including the constraint that the characters are sequentially arranged in accordance with a QWERTY keyboard, and the constraint on the number of keys in each row. The character groupings across the keys can be optimized for disambiguating words in a dictionary (weighted by frequency of use, for instance) given the constraints.

FIGS. 3-8 show several different embodiments of SIPs having different combinations of the characteristics described above. The SIPs 302, 402, and 802 in FIGS. 3, 4, and 8, respectively, comprise arced boundaries in the angular direction and linear boundaries in the radial direction. The SIPs 502, 602, and 702 in FIGS. 5, 6, and 7, respectively, comprise slanted linear boundaries instead of angular/radial boundaries.

Figure 5:
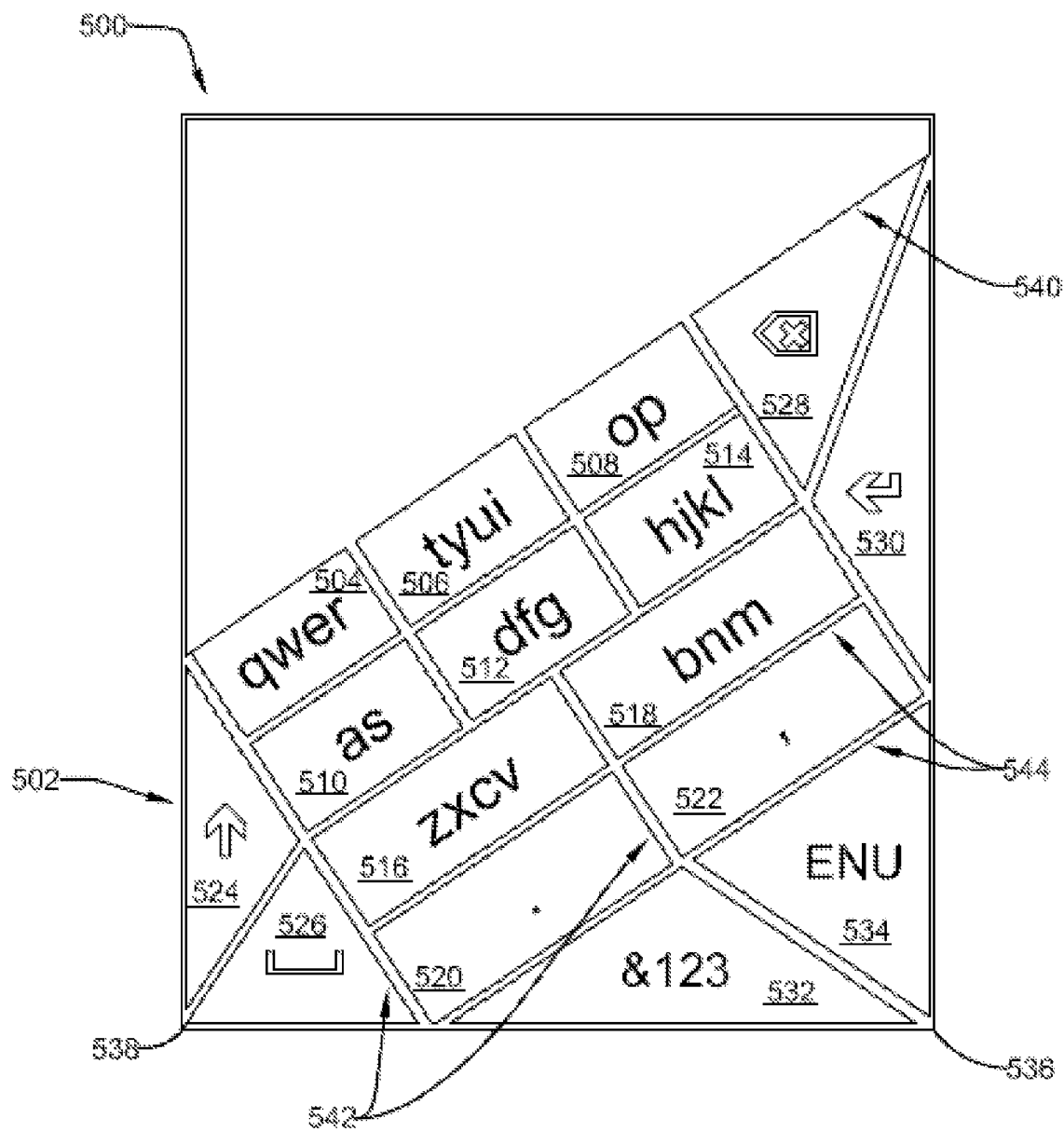

FIG. 5 shows a touchscreen 500 having an embodiment of a SIP 502 comprising keys 504 through 534 that each has a polygonal shape with linear boundaries. The keys 504 through 522 each have a rectangular shape defined by linear boundaries, some of which are labeled 542, that slant from the bottom right toward the top left, and linear boundaries, some of which are labeled 544 and 540, that are perpendicular to the boundaries 542. The keys 524 through 534 are triangular, being partially defined by the slanted boundaries 542, 544, and 540, and partially defined by the orthogonal bottom and side edges of the touchscreen 500. The keys 504-518 are arranged similarly as in the SIP 302 of FIG. 3, with similar groupings of characters across the letter keys 504-518.

Figure 6:
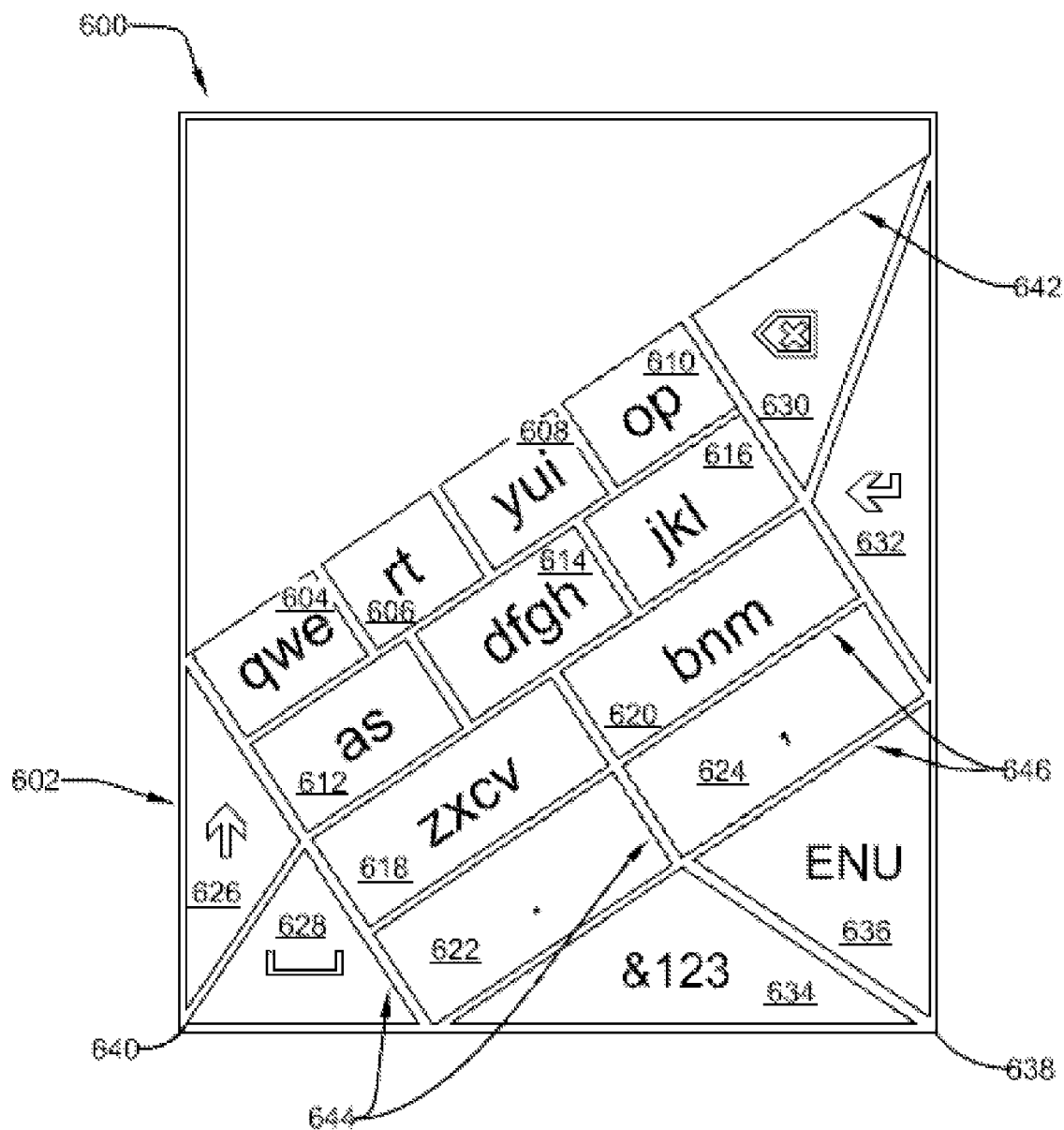

FIG. 6 shows another touchscreen 600 having an embodiment of a SIP 602 comprising keys 604 through 636 that each has a polygonal shape with linear boundaries. The keys 604 through 624 each have a rectangular shape defined by linear boundaries, some of which are labeled 644, that slant from the bottom right toward the top left, and linear boundaries, some of which are labeled 646 and 642, that are perpendicular to the boundaries 644. The keys 626 through 636 are triangular, being partially defined by the slanted boundaries 642, 644, and 646, and partially defined by the orthogonal bottom and side edges of the touchscreen 600. The keys 604-620 are arranged similarly as in the SIP 402 of FIG. 4, with similar groupings of characters across the letter keys 604-620.

Figure 7:
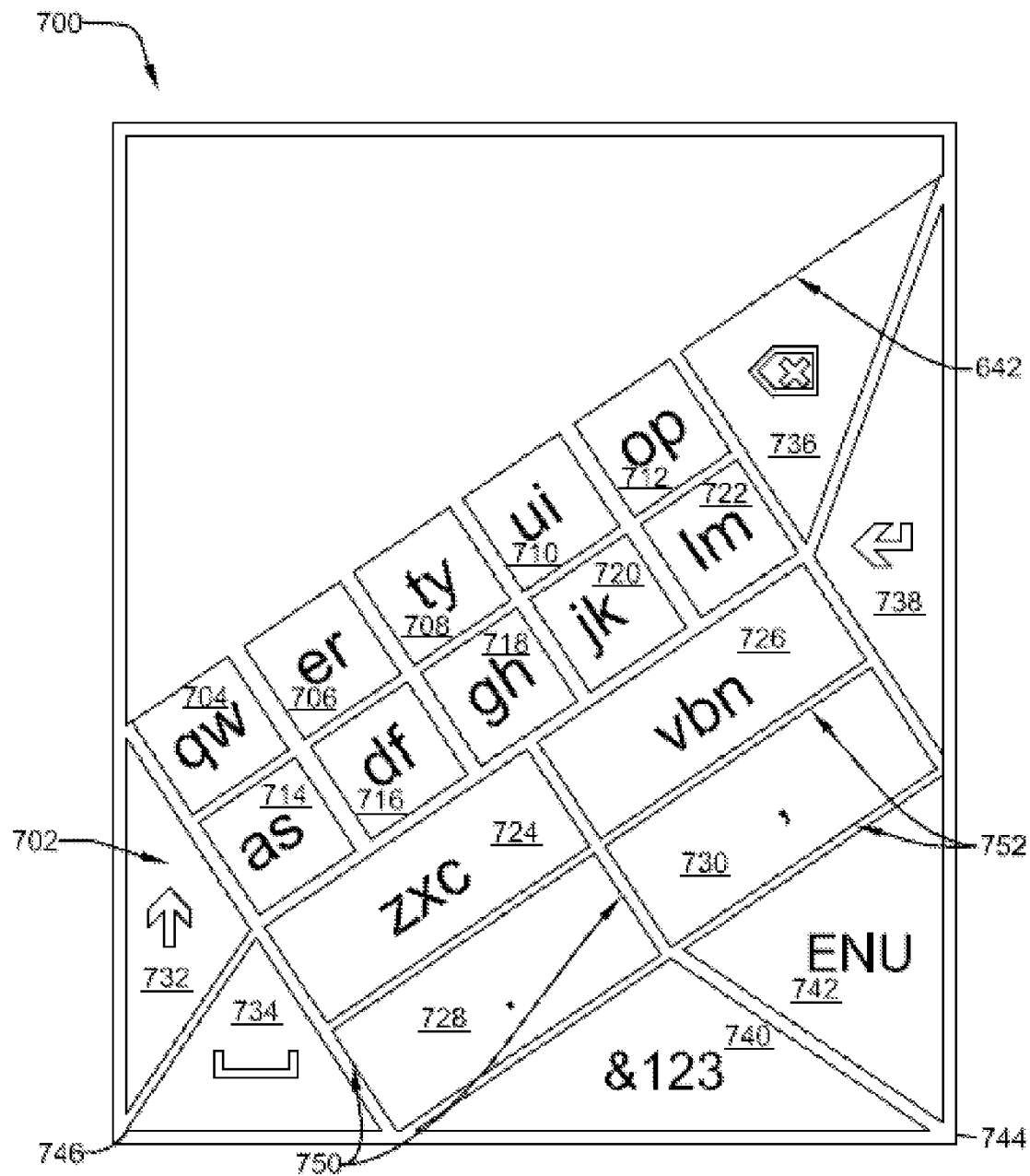

FIG. 7 shows yet another touchscreen 700 having an embodiment of a SIP 702 comprising keys 704 through 742 that each has a polygonal shape with linear boundaries. The keys 704 through 730 each have a rectangular shape defined by linear boundaries, some of which are labeled 750, that slant from the bottom right toward the top left, and linear boundaries, some of which are labeled 752 and 748, that are perpendicular to the boundaries 750. The keys 732 through 742 are triangular, being partially defined by the slanted boundaries 748, 750, and 752, and partially defined by the orthogonal bottom and side edges of the touchscreen 700.

The SIP 702 includes three rows of letter keys, wherein a first row is composed of five keys: 704-712, wherein the key 704 represents the characters "Q" and "W," the key 706 represents the characters "E" and "R," the key 708 represents the characters "T" and "Y," the key 710 represents the characters "U" and "I," and the key 712 represents the characters "O" and "P." The second row is also composed of five keys: 714-722, wherein the key 714 represents the characters "A" and "S," the key 716 represents the characters "D" and "F," the key 718 represents the characters "G" and "H," the key 720 represents the characters "J" and "K," and the key 722 represents the characters "L" and "M." The third row is composed of two keys: 724 and 726, wherein the key 724 represents the characters "Z," "X," and "C," and the key 726 represents the characters "V," "B," and "N." Therefore, the SIP 702 comprises two rows of letter keys that each include five keys and a row of letter keys that include two keys. Further, the SIP 702 comprises keys representative of two alphabetical characters and three alphabetical characters, but fails to include a key that is representative of four alphabetical characters. With respect to the SIP 702, the constraints imposed when determining a manner in which to group alphabetical characters can be a sequence of the characters (QWERTY), a number of rows of characters (e.g., 3), and a number of keys in each of the rows.

Additionally, as shown, the SIP 702 comprises a fourth row that includes keys 728 and 730, wherein such keys are representative of respective punctuation marks, such as a period and comma. The fourth row may additionally include other keys that are representative of punctuation marks commonly used, such as a question mark, colon, semicolon, etc. Still further, the SIP 702 comprises the key 740, which is split from the key 742.

Figure 8:
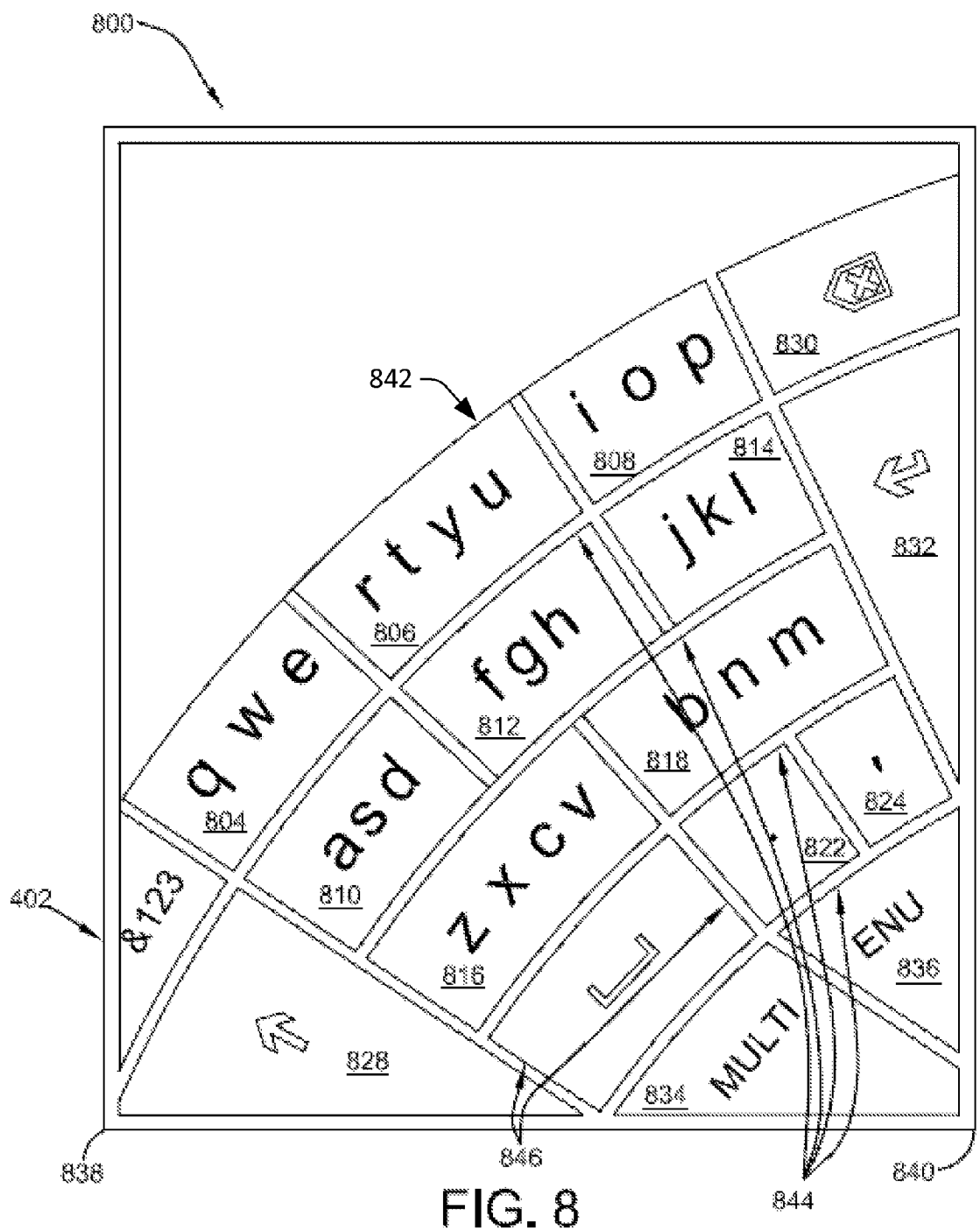

FIG. 8 shows a touchscreen 800 having an embodiment of a SIP 802 comprising keys 804 through 836 that are partially defined by linear slanted radial boundaries, some of which are labeled 846, partially defined by curved or arced boundaries 842 and 844, and/or partially defined by the side edges and bottom edge of the touchscreen 800, much like the SIPs 302 and 402 in FIGS. 3 and 4. The SIP 802 can include a "MULTI" key 834 that allows a user to switch to an alternative key layout, such as a layout having a different key for each letter in the alphabet. This can allow a user to manually type in words that the disambiguation program does not suggest, such as words that are not stored in dictionary of words that the disambiguation program relies upon.

The SIP 802 comprises three rows of letter keys. A first row is composed of three keys: the key 804, which represents the characters "Q," "W," and "E," the key 806, which represents the characters "R," "T," "Y," and "U." and the key 808, which represents the characters "I," "O," and "P." A second row is composed of three keys: the key 810, which represents the characters "A," "S," and "D," the key 812, which represents the characters "F," "G," and "H," and the key 814, which represented the characters "J," "K," and "L." A third row is composed of two keys: the key 816, which represents the characters "Z," "X," "C," and "V," and the key 818, which represents the characters "B," "N," and "M." The groupings of characters with the keys, in the SIP 802, as noted above, can be undertaken to optimize disambiguation of words in a particular dictionary (e.g., the dictionary of words employed by a user of the mobile device that includes the SIP 802) given specified layout constraints.

The SIPs 502, 602, and 702 differ in the grouping of the letters on the letter keys and the number of the letter keys. The SIP 502 comprises three keys 504, 506, 508 in the uppermost row of letter keys and the three keys 510, 512, 514 in the second row of letter keys. The SIP 602 comprises four keys 604, 606, 608, 610 in the uppermost row of letter keys, and three keys 612, 614, 616 in the second row of letter keys. The SIP 702 comprise five keys 704 through 712 in the uppermost row of letter keys, and five keys 714 through 722 in the second row of letter keys. The ten keys 704 through 722 in the SIP 702 each have the same height and width, and each correspond to two letters.

While the SIPs 502, 602, and 702 do not comprise curved or arced rows of keys like the SIPs 302 and 402, they can similarly be configured be accessible by a user's thumb reaching from either of the bottom corners of the touchscreen, and can be sized and switched between the two bottom corners in similar manners. Furthermore, with respect to any of the SIPs described herein, a gesture can cause an SIP to be unhidden (displayed on a touchscreen) or hidden (removed from display on the touchscreen). Furthermore, any of the SIP features described herein can be applied to both the arced SIPs 302 and 402 and the slanted SIPs 502, 602 and 702 in similar manners.

In some embodiments, the SIP can comprise a key, such as the "ENU" key 330, which allows the user to switch between different languages. In some embodiments, the SIP can be configured to be used with non-Latin languages, such as Arabic. In such cases, the layout of the keys and boundaries of the SIP can be adjusted to fit different numbers of characters and other functions that are used for text entry in other languages. Thus, when a user hits the language key to switch to a different language, the layout of the SIP can automatically adjust to a different layout to accommodate the different language.

Figure 9:
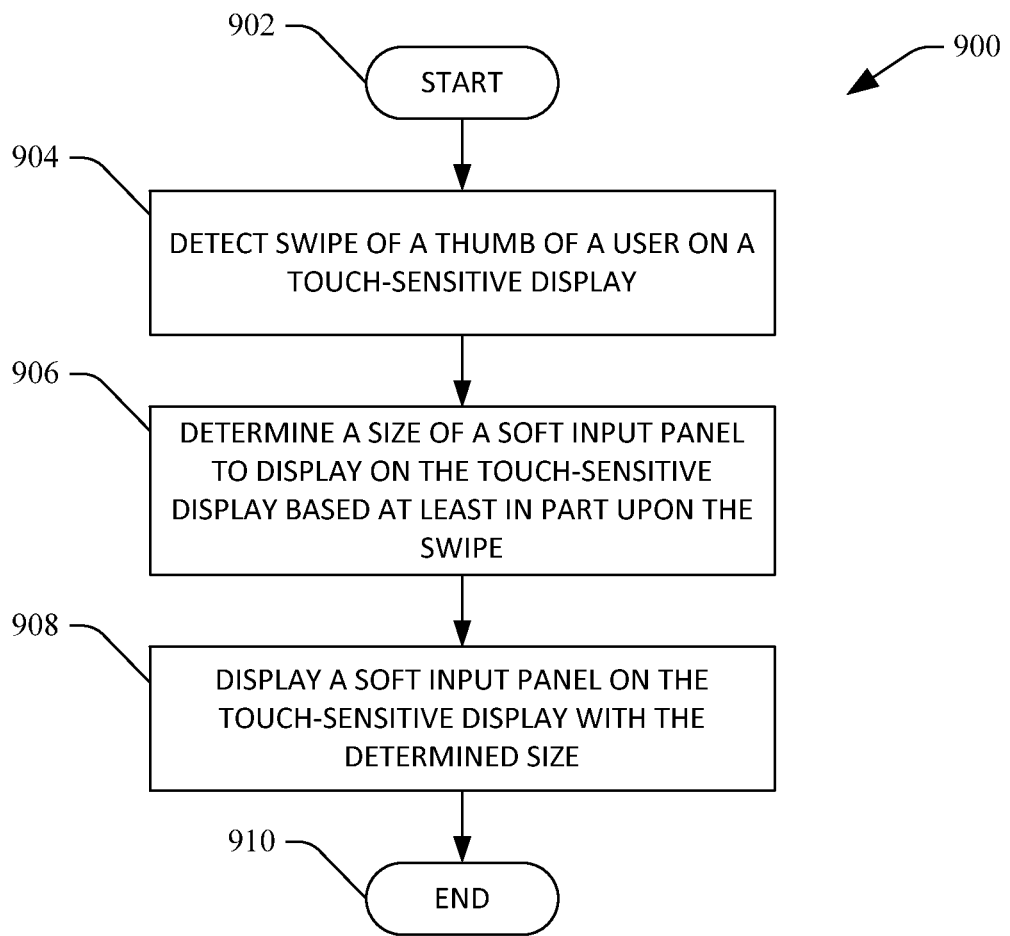
FIG. 9 is a flow diagram that illustrates an exemplary methodology for displaying a soft input panel on a display screen of a mobile device.
Figure 10:
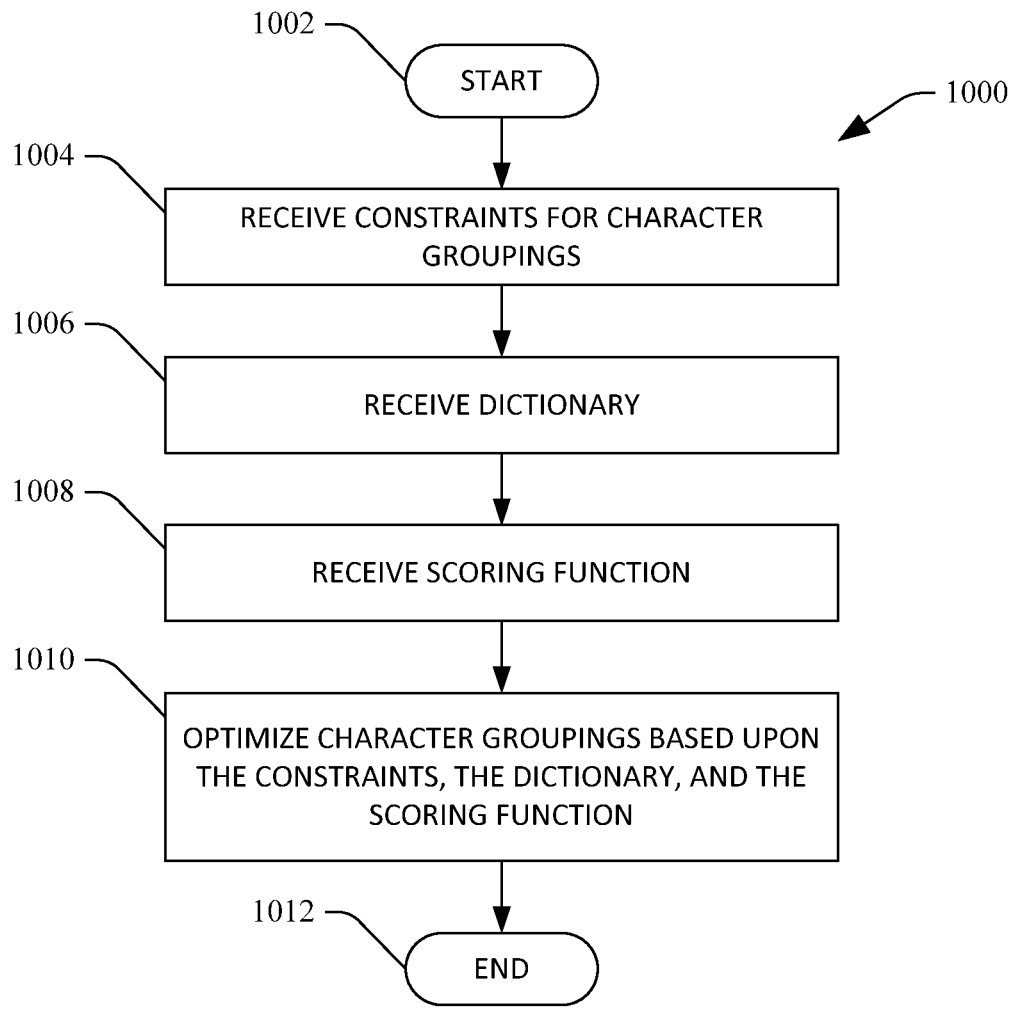
FIG. 10 is a flow diagram that illustrates an exemplary methodology for determining a configuration of keys in a soft input panel.

With reference to FIGS. 9 and 10, exemplary methods 900 and 1000 are illustrated and described. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., persistent computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., computer-readable storage media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

With reference now to FIG. 9, an exemplary method 900 that facilitates displaying a SIP on a touch-sensitive display of a mobile device is illustrated. The method 900 starts at 902, and at 904 a swipe of a thumb of a user is detected over a touch-sensitive display of the mobile computing device.

At 906, a size of a SIP that is to be displayed on the touch-sensitive display is determined based at least in part upon location of the swipe of the thumb of the user over the touch-sensitive display. For instance, extent of the reach of the thumb of the user from a particular side of the touch-sensitive display can be ascertained, and the ascertained extent can be used to determine where to place boundaries of the SIP (e.g., it is desirable to avoid positioning a key out of the reach of the thumb of the user).

At 908, subsequent to determining the size of the input panel, the soft input panel is displayed on the touch-sensitive display of the mobile computing device with the determined size. In an exemplary embodiment, the soft input panel can be displayed at an angular offset from edges of the touch-sensitive display, as shown in FIGS. 3-8. Additionally, the character groupings and arrangement of keys can be any of those shown in FIGS. 3-8 or similar groupings and arrangements. Further, the character groupings and arrangement of keys can be optimized with respect to a particular dictionary and scoring function, while observing constraints. It is to be understood, however, that in other embodiments, rather than sizing the soft input panel based upon a swipe of a thumb, the size of the soft input panel can be set to a default size (e.g., to accommodate an average thumb size). The method 900 completes at 910.

Now referring to FIG. 10, an exemplary method 1000 that facilitates determining character groupings for keys that represent multiple alphabetical characters is illustrated. The methodology 1000 starts at 1002, and at 1004 constraints for character groupings are received. Such constraints can include a sequence of the characters (e.g., QWERTY sequence, DVORAK sequence, alphabetical order (e.g., A, B, C), etc.), a minimum or maximum number of characters in a grouping, a number of keys over which characters groupings are spread, a number of rows to use for alphabetical keys, disallowed key combinations, etc.

At 1006, a dictionary is received. Such dictionary can be some number of most commonly used words in a particular language, such as English, Japanese, etc. In another example, the dictionary can be words known to be in a vocabulary of a user. At 1008, a scoring function is received. For example, the scoring function can be configured to assign scores to disambiguated character sequences (e.g., words) that correspond to the character groupings and the dictionary received at 1004. At 1010, character groupings are optimized based upon the constraints received at 1004, the dictionary received at 1006, and the scoring function received at 1008. The method 1000 completes at 1012.

Exemplary Mobile Device

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touchscreen 132 (which can display a SIP 133 as described herein), microphone 134, camera 136, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device. The input devices 130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 112 or applications 114 can comprise speech-recognition software as part of a voice user interface that allows a user to operate the device 100 via voice commands. Further, the device 100 can comprise input devices and software that allows for user interaction via a user's spatial gestures, such as detecting and interpreting gestures to provide input to a gaming application.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth 164 or Wi-Fi 162). The wireless modem 160 is typically configured for communication with one or more cellular networks, such as a GSM, CDMA, 3G, 4G, or LTE network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can be deleted and other components can be added.

Exemplary Computing Environment

Figure 2:
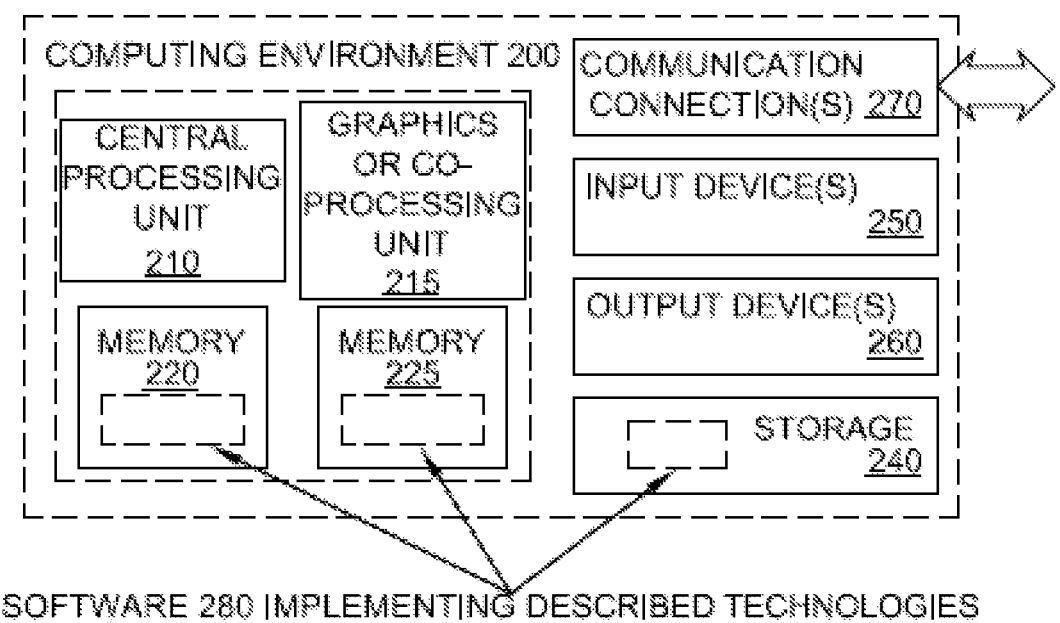
FIG. 2 is a schematic diagram illustrating a generalized example of a suitable computing environment for any of the disclosed embodiments.

FIG. 2 depicts a generalized example of a suitable computing environment 200 in which the described innovations may be implemented. The computing environment 200 is not intended to suggest any limitation as to scope of use or functionality, as the innovations may be implemented in diverse general-purpose or special-purpose computing systems. For example, the computing environment 200 can be any of a variety of computing devices (e.g., desktop computer, laptop computer, server computer, tablet computer, media player, gaming system, mobile device, etc.).

With reference to FIG. 2, the computing environment 200 includes one or more processing units 210, 215 and memory 220, 225. In FIG. 2, this basic configuration 230 is included within a dashed line. The processing units 210, 215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 2 shows a central processing unit 210 as well as a graphics processing unit or co-processing unit 215. The tangible memory 220, 225 may be volatile memory (e.g., registers, cache, RAM), nonvolatile memory (e.g., ROM, EEPROM, flash memory, etc.), or some combination of the two, accessible by the processing unit(s). The memory 220, 225 stores software 280 implementing one or more innovations described herein, in the form of computer-executable instructions suitable for execution by the processing unit(s).

A computing system may have additional features. For example, the computing environment 200 includes storage 240, one or more input devices 250 (such as the touchscreen embodiments described herein), one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The tangible storage 240 may be removable or non-removable, and includes magnetic disks, magnetic tapes or cassettes, CD-ROMs, DVDs, or any other medium which can be used to store information which can be accessed within the computing environment 200. The storage 240 stores instructions for the software 280 implementing one or more innovations described herein.

The input device(s) 250 may be a touch input device such as the touchscreen embodiments described herein, a keyboard, mouse, pen, or trackball, a voice input device, a scanning device, or another device that provides input to the computing environment 200. For video encoding, the input device(s) 250 may be a camera, video card, TV tuner card, or similar device that accepts video input in analog or digital form, or a CD-ROM or CD-RW that reads video samples into the computing environment 200. The output device(s) 260 may be a display, printer, speaker, CD-writer, or another device that provides output from the computing environment 200.

The communication connection(s) 270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in any suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope of these claims.

What is claimed is:

1. A mobile computing device, comprising:
   at least one processor; and
   a touch-sensitive display comprising a top edge, a bottom edge, a first side edge, and a second side edge, wherein the top edge is parallel to the bottom edge, the first side edge is parallel to the second side edge, and the first side edge is perpendicular to the top edge;
   memory storing instructions that, when executed by the at least one processor, cause the at least one processor to perform acts comprising:
      receiving an input from a user of the mobile computing device by way of the touch-sensitive display; and
      displaying a soft input panel on the touch-sensitive display responsive to the receiver component receiving the input from the user of the mobile computing device, the soft input panel comprising a plurality of keys that are angularly offset from the top edge, the bottom edge, the first side edge, and the second side edge, the plurality of keys comprising:
         a first set of keys, each key in the first set of keys representing a respective character grouping that includes multiple characters, a first key in the first set of keys representing a first character grouping of three alphabetical characters and a second key in the first set of keys representing a character grouping of four alphabetical characters, wherein the first key is larger than the second key.

2. The mobile computing device of claim 1, wherein the first set of keys comprises a third key that represents a third character grouping of two alphabetical characters.

3. The mobile computing device of claim 2, wherein the first set of keys is arranged in a plurality of rows, wherein a first row in the plurality of rows comprises the first key and the third key.

4. The mobile computing device of claim 3, wherein the first key and the third key are immediately adjacent to one another in the first row.

5. The mobile computing device of claim 2, wherein the first set of keys is arranged in a plurality of rows, wherein a first row in the plurality of rows comprises the third key and the second key.

6. The mobile computing device of claim 5, wherein the third key and the second key are immediately adjacent to one another in the first row.

7. The mobile computing device of claim 1, wherein the first set of keys comprises a third key and a fourth key, the third key representing a third character grouping of two alphabetical characters and the fourth key representing a fourth character grouping of two alphabetical characters.

8. The mobile computing device of claim 7, wherein the first set of keys is arranged in a plurality of rows, wherein a first row in the plurality of rows comprises the third key, and wherein a second row in the plurality of rows comprises the fourth key.

9. The mobile computing device of claim 8, wherein the third character grouping is "O" and "P," and wherein the fourth character grouping is "A" and "S".

10. The mobile computing device of claim 1, wherein the first set of keys is collectively representative of an entirety of the English alphabet, and wherein the first set of keys is arranged such that respective character groupings conform to a QWERTY keyboard.

11. The mobile computing device of claim 1, wherein the first set of keys is composed of eight keys.

12. A method, comprising:
   detecting a swipe of a thumb of a user on a touch-sensitive display of a mobile device; and
   responsive to the detecting, displaying a soft input panel on the touch-sensitive display, the soft input panel facilitating receipt of user input on keys thereof to generate text, the soft input panel comprising:
   a first set of keys arranged in a plurality of rows, each key in the first set of keys being representative of a respective grouping of alphabetical characters, wherein a first row in the plurality of rows comprises a first key that is representative of a three character grouping of characters, a second row in the plurality of rows comprises a second key that is representative of a four character grouping, and a third row in the plurality of rows comprises a third key that is representative of a two character grouping, wherein the first key is larger than the second key, wherein the first row, the second row, and the third row extend are arranged radially from about a corner of the touch-sensitive display, wherein the first third row is furthest from the corner of the touch-sensitive display relative to the second row and the third first row.

13. The method of claim 12, wherein the displaying the soft input panel on the touch-sensitive display comprises displaying each key in the first set of keys at an angular offset to edges of the touch-sensitive display, wherein the detecting of the swipe comprises detecting an extent of the swipe on the touch-sensitive display, and wherein at least one key in the first set of keys is displayed at a position on the touch-sensitive display that is based at least in part upon the detecting of the extent of the swipe on the touch-sensitive display.

14. The method of claim 12, wherein the third row comprises a fourth key that is representative of a second two character grouping, the first two character grouping is "O" and "P," the second two character grouping is "A" and "S," and the three character grouping is "B," "N," and "M".

15. The method of claim 12, wherein character groupings of keys in the first set of keys are ordered in accordance with a QWERTY keyboard.

16. The method of claim 12, wherein the third row further comprises a fourth key that is representative of a four character grouping, the third key and the fourth key being adjacent to one another in the third row.

17. The method of claim 12, wherein the corner is a bottom corner of the touch-sensitive display.

18. The method of claim 12, further comprising:
   determining a size of the soft input panel based at least in part upon the swipe of the thumb of the user, wherein the displaying of the soft input panel comprises displaying the soft input panel on the touch-sensitive display with the size.

19. The method of claim 12, wherein the third row comprises a fourth key that is representative of a second four character grouping, and the fourth key is larger than the second key.

20. A computer-readable storage medium comprising instructions that, when executed by a processor, cause the processor to perform acts comprising:
   detecting a swipe of a thumb of a user over a touch-sensitive display of a mobile computing device;
   determining a size of a soft input panel to display on the touch-sensitive display of the mobile computing device based at least in part location of the swipe of the thumb of the user over the touch-sensitive display;
   subsequent to determining the size of the soft input panel, displaying the soft input panel on the touch-sensitive display of the mobile computing device with the size, the soft input panel displayed at an angular offset from edges of the touch-sensitive display, the soft input panel comprising:
   a first set of keys, each key in the first set of keys representative of a respective character grouping that comprises multiple alphabetical characters, the first set of keys arranged in a plurality of rows, the plurality of rows comprising:
   a first row that comprises a first key that is representative of a first two character grouping and a second key that is representative of a first four character grouping, the first key and the second key immediately adjacent to one another in the first row;
   a second row that comprises a third key that is representative of a second two character grouping, a fourth key that is representative of a first three character grouping, and a fifth key that is representative of a second four character grouping, the third key and the fourth key immediately adjacent to one another in the second row, the fourth key and the fifth key immediately adjacent to one another in the second row; and
   a third row that comprises a sixth key that is representative of a second third four character grouping and a seventh key that is representative of a second three character grouping, the sixth key and the seventh key immediately adjacent to one another in the third row, the seventh key is larger than the fifth key.

* * * * *